United States Patent [19]

Lorenze, Jr.

[11] 4,418,472
[45] Dec. 6, 1983

[54] METHOD OF DELINEATING THIN FILM MAGNETIC HEAD ARRAYS

[75] Inventor: Robert V. Lorenze, Jr., Webster, N.Y.

[73] Assignee: Xerox Corporation, Stamford, Conn.

[21] Appl. No.: 324,195

[22] Filed: Nov. 23, 1981

[51] Int. Cl.³ .............................................. G11B 5/42
[52] U.S. Cl. ..................................... 29/603; 360/121; 360/122
[58] Field of Search .................. 29/603; 360/119–122; 219/121 M, 121 H, 121 J, 121 K

[56] References Cited

U.S. PATENT DOCUMENTS

| | | | |
|---|---|---|---|
| 3,344,237 | 9/1967 | Gregg | 179/100.2 |
| 3,787,964 | 1/1974 | Simon et al. | 29/603 |
| 4,049,944 | 9/1977 | Garvin et al. | 219/121 EM |
| 4,085,022 | 4/1978 | Wechsung et al. | 204/192 E |
| 4,147,564 | 4/1979 | Magee et al. | 148/1.5 |

OTHER PUBLICATIONS

Stoller, "The Etching of Deep Vertical-Walled Patterns in Silicon," RCA Review, 31,271 (Jun. 1970).
Lazzari, "Integrated Magnetic Recording Heads: Review and Outlook," Am. Institute of Physics Conf. Proceedings 18,990 (1973).
Chynoweth, "Pedro-A Transducer-Per-Track Recording System with Batch-Fabricated Mag. Film Read/Write Transducers," Honeywell Computer Journal 7,103 (1973).
Bollinger, "Ion Milling for Semiconductor Production Processes," Solid State Technology, 66 (Nov. 1977).
Lee, "Microfabrication by Ion-Beam Etching," J. Vac. Sci. Technol., 16 (2), 164 (Mar./Apr. 1979).
Petersen, "Thin Film Magnetic Heads," IBM Tech. Disclosure Bulletin, 21, No. 12,5002 (May, 1979).
Bean et al, "Appln. of Silicon Crystal Orientation & Anisotropic Effects to the Control of Charge Spreading in Devices," IEEE J. Sol. Stat. Circ. SC-9, No. 3,111 (Jun. 1974).
Romankiw et al, "Batch Fabrication of Thin Film Mag. Recording Heads: A Lit. Review & Process Description for Vertical Single Turn Heads," IEEE Trans. Mag. MAG-11,50 (1975).
Kendall, "On Etching Very Narrow Grooves in Silicon," Appl. Phys. Lett., 26, No. 4, 195 (Feb. 15, 1975).

Primary Examiner—Carl E. Hall

[57] ABSTRACT

A method for delineating vertically configured thin film magnetic heads formed upon silicon wafer substrates. A plurality of thin film magnetic head arrays are formed on a (110) oriented surface of a single crystal silicon substrate so that the edges of the arrays are aligned parallel to the {111} planes of the substrate. Following photolithographic formation of a mask, ion beam milling perpendicular to the (110) oriented surface of the silicon substrate delineates the thin film magnetic head array structures. Thereafter, the remainder of the silicon substrate is anisotropically etched to completely delineate the individual array structures.

7 Claims, 3 Drawing Figures

METHOD OF DELINEATING THIN FILM MAGNETIC HEAD ARRAYS

BACKGROUND OF THE INVENTION

This invention broadly relates to methods for delineating individual thin film magnetic head arrays from a substrate and, more particularly, to a high yield, reproducible delineation method which results in precise, well-defined gap regions and which is readily adapted to cost effective batch processing.

The development of thin film magnetic head arrays has become the subject of increased interest, especially in the area of high speed, high density recording (and retrieval) of digital computer information on magnetic media (tapes, disks). Thin film magnetic head arrays, because they can be fabricated using modified versions of the batch processing technolgies employed by integrated circuit manufacturers offer a number of distinct advantages over conventional (wire-wound, ferrite core) magnetic heads. Such advantages include: (1) cost-effective manufacture of high density multi-element arrays with precise head geometries and dimensional tolerances, since thin film deposition and photolithographic technologies are utilized; (2) potential for improved frequency response (due to material and geometry) and a more precise "track" definition (due to sharper field gradients); (3) potential for better head-to-head uniformity and increased reliability; and (4) potential for totally (or partially) integrated addressing electronics, again resulting in lower costs, high speed, and better reliability.

Known methods for fabricating thin film magnetic head arrays typically consist of sequentially depositing thin film layers of magnetic, conductive, and insulative materials. The magnetic thin film layers (usually Permalloy) form the magnetic yoke of the head structure and serve the function of concentrating magnetic flux according to desired geometries. The conductor thin film layer, typically gold or copper, form the "turns" or windings around the magnetic yoke of the individual heads which induce a magnetic field when current is passed through them. The delineated layer of conductive thin films also provides electrical interconnection between the coil section of the heads and the power supply/addressing network which is used to activate the array. Finally, insulator thin film layers (polyimides, $SiO_2$) are used to electrically isolate the various thin film conductor layers (especially in multi-turn head designs), as well as to provide precise gap spacing between upper and lower layers of the magnetic yoke. The various thin film layers are typically deposited by a variety of techniques including vacuum deposition (sputtering, evaporation), electroplating, and spin-coating (e.g., for spin-on insulator materials). The resultant multi-layer thin film array structure is fabricated on a rigid substrate (e.g., silicon wafer), and the thin film layers are delineated into patterns (as required) using photolithographic masking and wet chemical or plasma etching techniques. A completed thin film magnetic head array typically consists of anywhere from a few to several hundreds of individual heads (at densities of 50-300 heads per inch), and can vary from a few tenths of an inch to several inches in length. Multiple arrays (or array modules) are processed simultaneously on a given substrate, and many substrates are processed together so that cost advantages of batch fabrication are realized.

The vast majority of the known thin film magnetic head structures utilize the so called vertical configuration in which the gap length is perpendicular to the plane of the substrate, as illustrated in FIG. 2. The presence of the substrate in the recording plane makes this structure resistant to wear and scratches. Achieving this wear resistance, however, requires that the arrays of heads be precisely delineated from the substrate in order to complete the array fabrication cycle. In the known processes, this delineation of individual arrays from the silicon wafer substrate is accomplished by a dice and lap procedure. The dicing operation is usually performed with a high speed microelectronic dicing saw using thin diamond impregnated cutting wheels. Although such equipment is capable of accurate delineation of wafer substrates and leaves relatively smooth surfaces on the cut edges, smearing of the thin film layers, edge chipping and some degree of cut-edge surface roughness are always present. To make the heads operational, the individual arrays must then be edge-lapped to achieve the desired surface finish and thin film definition in the gap region (generally designated 16 in FIG. 2). This lapping/polishing process is particularly undesirable for the following reasons: (1) it is not a "batch" process, since arrays typically must be mounted and lapped individually, or at best, a few at a time with elaborate fixturing; (2) the process is extremely operator dependent since each array must be manually aligned and mounted to precise tolerances, then sequentially lapped through a series of grit sizes to achieve the desired result. End point of the process and uniformity of the process across long arrays are typically difficult parameters to control. Hence, the procedure is time consuming and may not yield consistent results; (3) the arrays are subject to much handling and potential mechanical abuse during both the dicing and lapping processes, contributing to low device yields. Such a low yield process step near the end of a fabrication cycle is particularly costly since much time and effort has typically been expended on the device to arrive at this point; and (4) the array edge-lapping process is not one that can be easily automated to high volume manufacturing levels at which the unit cost of batch process devices can be very low.

Accordingly, there exists a need for an alternative method of thin film magnetic head array delineation which will provide cost effective batch processing, while simultaneously assuring precise recording gap definition and high yields.

SUMMARY OF THE INVENTION

In accordance with the invention there is provided a method for delineating thin film magnetic heads, and in particular, individual array modules of thin film magnetic heads, from silicon wafer substrates. To initiate the process, a single crystal silicon substrate having a (110) surface orientation is prepared. Although not essential, it is preferable to thermally grow a thin oxide (silicon dioxide) layer on the surfaces of the wafer to protect it during subsequent processing. With this (110) surface orientation, certain sets of the more etch resistant{111} planes of the crystal silicon substrate are oriented perpendicular to the wafer surface. The multilayer thin film magnetic head array structures are then fabricated upon the surface of the substrate or thin oxide layer so that the critical preliminary array edges (and the gap regions of the individual heads) are aligned substantially perpendicular to the (110) oriented surface and substantially coincident with a one of the {111} planes. When the array architecture is complete, instead of dicing and lapping the individual arrays, a final mask is formed having openings, or slot patterns, which coincide with the array edges to be delineated, i.e each of the thin film magnetic head structures has associated therewith an opening having an edge surface that lies in a {111} plane; this plane will subsequently include the magnetic head array contact surface and the final, individual, magnetic head gap regions. Next, the wafers are placed in an ion beam milling system and the masked structure is milled at right angles to the surface of the substrate through the thin film layers into the silicon substrate. When this is completed, the milled structures are immersed in a silicon preferential etch solution to anisotropically etch entirely through the wafer, delineating the individual arrays. The resultant arrays exhibit uniform, smooth substrate walls precisely aligned with the thin film magnetic head array gap regions.

DESCRIPTION OF THE PREFERRED EMBODIMENT

Figure 1:
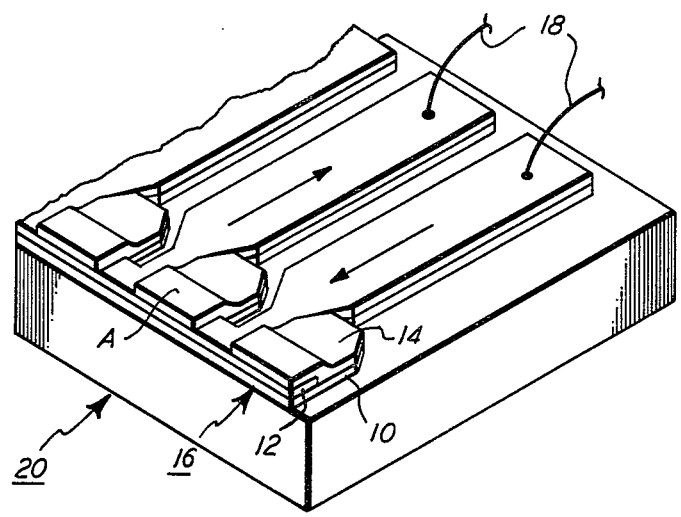
FIG. 1 illustrates an exemplary single turn, vertically configured thin film magnetic head array.
Figure 2:
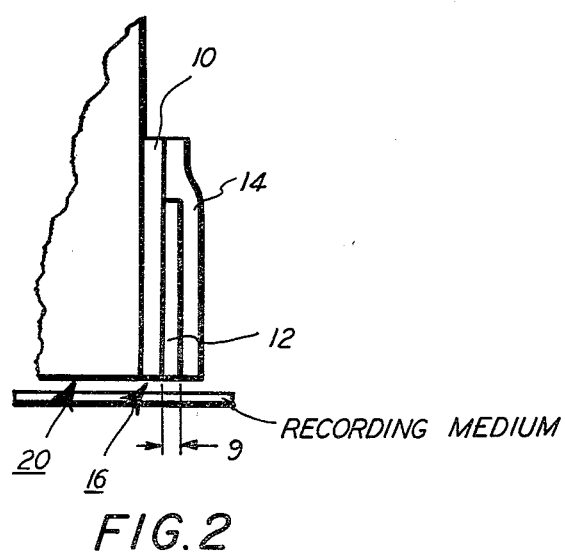
FIG. 2 illustrates a cross-section of one of the single turn thin film magnetic heads of FIG. 1.

A simple single-turn film magnetic head array (vertical configuration) is shown in FIGS. 1 and 2. This illustrative magnetic head array is substantially identical to the array reported by W. Chynoweth et al in "PEDRO- A Transducer-Per-Track Recording System with Batch-Fabricated Magnetic Film Read/Write Transducers," *Honeywell Computer Journal* 7,103 (1973), which is incorporated by reference herein. Although the invention will be herein described with reference to this single-turn array, the method of the invention is generally adapted for delineation of all types of multi-layer thin film magnetic head array structures fabricated on silicon wafer substrates and, accordingly, it is not necessarily limited in its application to the particular embodiment shown herein.

As noted above, FIG. 1 is a perspective view of an illustrative single-turn thin film magnetic head array. It will be appreciated that, while only three individual heads are shown in FIG. 1, the typical array modules may include up to several hundred individual heads.

As shown in FIG. 1 and the cross-sectional view of FIG. 2, each head is a three-layer thin film structure produced by selectively depositing an d patterning a first magnetic (e.g. Permalloy) layer 10, a conductor (e.g., gold) layer 12, and top magnetic (e.g., Permalloy) layer 14. Conventional procedures such as vacuum deposition, photolithography, and the like may be used to form the thin film head structure of FIGS. 1 and 2. As can be seen, the two magnetic layers, 10 and 14 are delineated so as to define the magnetic yoke of the head structure which functions to concentrate the magnetic flux in the gap region which is generally designated 16 in FIGS. 1 and 2. The gold conductor layer is delineated to fill the gap g (see FIG. 2) of each individual head and to define conductors which form in conjunction with the gap conductor, the generally U-shaped turn or winding around the magnetic yoke. For the head designated A in FIG. 1, a magnetic field is induced when current is passed in the direction indicated by arrows, for example, when activated by an addressing or driver network connected (for example by wire bonding) via leads 18.

As noted above, commercialization of thin film magnetic head arrays necessitates a cost effective batch process in which multiple arrays are formed upon a wafer or wafers. Once such mutli-array structures have been fabricated, they must be individually delineated or separated, from the wafer. The known array delineation methods typically employ manual dicing and lapping techniques to precisely delineate the thin film magnetic head array structures and expose the gap region. Thus to complete a vertically configured magnetic head array such as illustrated in FIGS. 1 and 2, the module must be diced from the silicon wafer substrate in the plane of edge 20. To achieve the necessary degree of smoothness and definition of the gap region, the individual arrays have conventionally been edge-lapped. This lapping/polishing process is both time consuming and operator dependent and thus, not easily automated.

Figure 3:
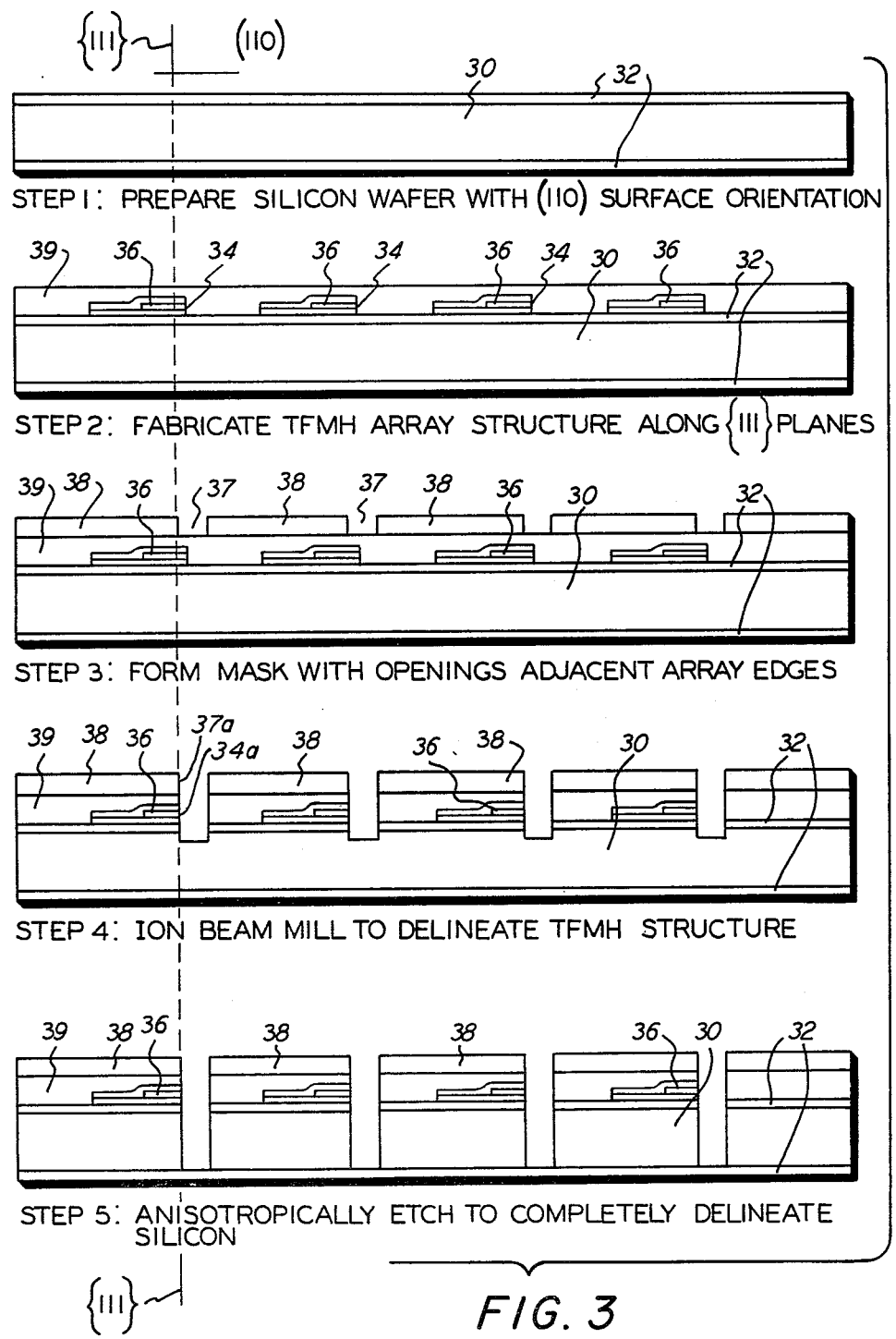
FIG. 3 illustrates stages in a process according to the present invention.

The present invention eliminates these undesirable techniques and provides a cost effective batch processing technique which is more clearly understood with reference to FIG. 3. Initially, a single crystal silicon wafer substrate 30 having a (110) surface orientation is prepared. Preferably, the wafer includes oxide layers 32 thermally grown on the upper and lower wafer surface to a thickness of approximately 3,000–10,000 Angstroms to protect the wafer surfaces from subsequent processing during the fabrication of the thin film magnetic head array structures. The so prepared wafer will have a set of planes (certain of the {111} planes) intersecting the (110) surface at right angles as illustrated by the set of axes (one shown) in FIG. 3. As pointed out by A. I. Stoller, "The Etching of Deep-Vertical Walled Patterns in Silicon," *RCA Review*, 31,271 (June, 1970), utilization of a (110) surface oriented silicon wafer makes it both possible and practical to etch deep patterns in silicon with walls almost exactly perpendicular to the surface, using a conventional caustic etch solution (e.g., 100g KOH in100 cc of $H_2O$). The Stoller disclosure is herein incorporated by reference. As will be explained more fully hereinafter, this anisotropic etching (or orientation dependent etching) of single crystal silicon is utilized (after masking and ion beam milling of the thin film layers to expose the head gap regions) to etch vertical walled slots entirely through the wafer substrate 30 to completely delineate the array modules. Such anisotropic etching is founded upon the characteristic the certain crystallographic planes (faces) etch rapidly when exposed to caustic etch solutions, while others etch negligibly when exposed to the same solution. In particular, the {111} plane in silicon are highly resistant to such etches, while the (100) and (110) surfaces are not. Thus, alignment of the straight line patterns of a mask parallel to the {111} planes which intersect the (110) surface of a wafer such as substrate 30 in FIG. 3 enables high aspect ratio etching of well defined vertical grooves.

To realize the foregoing, the multi-layer thin film magnetic head array structures are fabricated according to the procedure discussed above on the (110) oriented surface of the crystal substrate or oxide layer thereof as shown in step 2 of FIG. 3. The preliminary array edges 34 are sustantially aligned to lie in a one of the {111} planes of the crystal substrate 30 and, hence substantially perpendicular to the (110) oriented surface. While the illustrated thin film magnetic head arrays 36 correspond to the single turn head arrays of FIGS. 1 and 2, the delineation procedure of the present invention is not intimately dependent upon the details of the array design. For advantageous employment of the method, it is required only that the thin film magnetic head structures be of the vertically configured type.

When the array architecture is complete, instead of dicing and lapping the individual arrays from the substrate, a final mask 38 is applied in preparation for ion beam milling and subsequent anisotropic etch. An individual opening, or slot 37, is associated with each array structure and includes at least one edge surface 37a which coincides with (i.e., coplanar with) the {111} plane containing the final, critical array edges or magnetic head contact surfaces 34a to be delineated. This alignment is illustrated with a slightly exaggerated scale in step 3 of FIG. 3, in which openings 37 in mask 38 are shown aligned in relation to the head array structures 36. An optionally includable encapsulant 39 is shown in steps 2 and 3 of FIG. 3 in conformal overlayment of the head array structures and exposed surfaces of the thermally grown oxide coating 32. Such an encapsulant may be included as a means for protecting portions of the array structures which are not to be etched from the caustic anisotropic etching solutions. The protective encapsulant may comprise material employed for the mask. Since, in preferred form, the mask comprises a photoresist, protection of the thin film magnetic head structues may be easily accomplished when photoprocessing the mask. Alternatively, the encapsulant may be a temporary layer of a material such as polyimide or a metal. While almost any photoresist (spin-on or dry film) may be utilized for the mask, the resist which is selected should exhibit a relatively slow etch rate when exposed to ion beam milling. Shipley AZ 1350 J is a good candidate since it can be applied in relatively thick layers and has a low ion beam milling rate (approximately 225 Angstroms/minute). It will be appreciated that slot geometries depend on the particular array design and spacing between arrays. Typically, however, the slots may be 0.001"–0.010" in width, and 0.010"–0.020" longer than the overall array length.

After masking the structures, the wafer or wafers are placed in an ion beam milling system where the slot patterns are milled at an angle perpendicular to the wafer surface (i.e., parallel to the {111} planes of the silicon substrate) until the thin film layers comprising the thin film magnetic head array structure are completely delineated in the gap region (step 4 of FIG. 3). An ion beam milling system consists basically of a vacuum chamber, an ion beam source (ion gun), a substrate support platen, and a high vacuum pumping station. In operation, a low pressure gas plasma (inert or reactive) is generated in the ion gun region of the vacuum chamber, and a high energy collimated ion beam is extracted out into the higher vacuum region of the chamber. When the beam is incident upon target material (i.e., substrates to be milled), the material is sputter etched at a rate dependent upon the particular material properties. Although virtually all materials can be ion beam milled, the wide range in milling rates permits the use of some materials as effecttive masking layers, so that fine geometry patterns can be easily and precisely delineated. For varying head structure and thin film materials employed in the fabrication thereof, a simple electroformed metal mask (shadow mask) may have to be used in conjunction with the photomask to provide adequate array protection, as will be apparent to those skilled in this art. Because of the variance in milling rates of particular thin film materials which may be employed (and the variance in their occurrence along the array structure), the degree of ion beam milling of the silicon along the array may also vary from design to design. The ion beam milling operation is complete when no thin film residue remains in the photomask slots. As a further alternative, reactive ion beam milling may be employed in step 4.

After completion of the milling operation, the wafers are immersed in a silicon preferential etch solution (e.g., a warm (85°–100° C.) 44–50% KOH and water solution) until the slot patterns are etched entirely through the wafer. As discussed above, given the orientation of the mask and milled slots formed therethrough, this anisotropic etch step produces uniform, smooth vertical walled slots precisely located with respect to both the sustrate and the critical edges of the individual arrays. For precisely oriented and aligned wafers, aspect ratios of up to 600:1 are realizable. Thus, for typical wafers (approximately 0.012" thick), undercutting of the mask by the etchant solution will be of submicron dimensions, which is totally acceptable. Since most photoresist emulsions dissolve in caustic solutions such as the one described above, it may be desirable to strip the resist prior to the silicon orientation dependent etching, allowing the ion beam milled array structure to serve as a mask for the anisotropic etching. The appropriate etch for a particular application depends upon the etch resistance of the thin film materials involved and the desired etch rates. Known alternate etches include such materials as hydrzaine-catechol, hydrazine-alcohol, and ethylene diamine in addition to a variety of modified KOH etches. After completion of the silicon ODE step, the thin film magnetic head array/substrate delineation along the critical magnetic gap edge is essentially complete. All that remains is the (non-critical) dicing of arrays at the extreme edges (which can be accomplished by conventional techniques) and the stripping and cleanup of residual masking, as required. It can be appreciated by those workers skilled in the art that certain variations and/or modifications to the basic procedures described above can be incorporated in order to apply to specific thin film array structures without significantly deviating from the intent or spirit of the present invention. One such modification, for example, would be the use of more elaborate or additional masking procedures (or a rearrangement of process steps) such that those thin film layers exposed during the ion beam milling operation which are particularly sensitive to the silicon ODE solution(s) are adequately protected.

Recapitulating, the present invention provides a method of delineating vertical configuration thin film magnetic head arrays fabricated on silicon wafer substrates by a process which incorporates the sequential use of photolithographic masking, ion beam milling, and anisotropic etching of silicon. The method employs cost effective batch processing techniques and offers the potential of a consistent, precise and high yield delineation technique for thin film magnetic head arrays.

I claim:
1. A method of forming thin film magnetic head arrays, comprising the steps of:
   (a) preparing a single crystal silicon substrate having a surface with a (110) orientation and having a plurality of {111} planes intersecting said surface;

(b) fabricating a plurality of the thin film magnetic head arrays on the (110) oriented surface of said substrate, each array comprising a plurality of vertically configured, thin film magnetic head structures, each magnetic head structure in an array having a gap region aligned substantially in a one of said {111} planes, the gap regions of the magnetic head structures making up an array being substantially parallel with those of the other arrays on said substrate;

(c) forming a mask over the magnetic head arrays and exposed portions of said substrate, the mask having a pattern of openings, each opening exposing selected portions of each of said magnetic head structures making up an array and having an edge surface which lies in a selected {111} plane that is subsequently to include the array contact surface and the gap regions of the individual magnetic head structures making up the array associated with that opening;

(d) ion beam milling the masked structure of step (c) along the selected {111} plane and at angles perpendicular to the (110) oriented surface of said substrate to etch through the exposed portions of said thin film magnetic head structures and into part of said substrate; and (e) anisotropically etching completely through the remainder of the milled substrate of step (d) along the selected {111} planes.

2. The method of claim 1, wherein said mask comprises a photoresist mask.

3. The method of claim 1 wherein said single crystal silicon substrate includes an oxide layer thermally grown upon said (110) surface and wherein said fabricating step (b) comprises fabricating thin film magnetic head arrays on said oxide layer, and wherein said ion beam milling step (d) comprises milling, in succession, through the exposed portions of said thin film magnetic head structures, said oxide layer, and into part of said substrate.

4. A method of forming a thin film magnetic head structure, comprising the steps of:

(a) preparing a single crystal silicon substrate having a surface with a (110) orientation and having a plurality of {111} planes intersecting said (110) surface;

(b) fabricating a vertically configured thin magnetic head on the (110) oriented surface of said substrate, said thin film magnetic head having a preliminary gap region aligned substantially in one of said {111} planes;

(c) forming an encapsulating layer over the thin film magnetic head of step (b);

(d) forming a mask over said encapsulating layer, said mask having an opening which exposes selected portions of such encapsulating layer, said opening having at least one edge surface which lies in a selected {111} plane that is to include subsequently a magnetic head contact surface that incorporates said gap region;

(e) ion beam milling the masked structure of step (d) along the selected {111} plane and at an angle perpendicular to the (110) oriented surface of said substrate to etch through the exposed portions of said encapsulating layer, said thin film magnetic head, and into part of said substrate; and (f) anisotropically etching completely through the remainder of the milled substrate of step (e) along the selected {111} plane.

5. A method of claim 4, wherein said encapsulating layer comprises a temporary protective encapsulant.

6. The method of claim 4 wherein said encapsulating layer and said mask comprise photoresist.

7. The method of claim 4 wherein said single crystal silicon substrate includes an oxide layer thermally grown upon said (110) surface and wherein said fabricating step (b) comprises fabricating a vertically configured thin film magnetic head upon said oxide layer, and wherein said ion beam milling step (e) comprising milling, in succession, through the exposed portions of said encapsulating layer, said thin film magnetic head, and said oxide layer and into part of said substrate.

* * * * *